United States Patent
Monin et al.

(10) Patent No.: US 9,020,481 B1
(45) Date of Patent: Apr. 28, 2015

(54) ENHANCED MOBILITY STATE DETECTION IN MOBILE COMMUNICATION TERMINALS

(75) Inventors: Ofer Monin, Ness-Ziona (IL); Irina Raz, Holon (IL); Tal Porat, Jerusalem (IL)

(73) Assignee: Marvell International Ltd., Hamilton (BM)

( * ) Notice: Subject to any disclaimer, the term of this patent is extended or adjusted under 35 U.S.C. 154(b) by 541 days.

(21) Appl. No.: 13/409,136

(22) Filed: Mar. 1, 2012

Related U.S. Application Data

(60) Provisional application No. 61/450,075, filed on Mar. 7, 2011.

(51) Int. Cl.
*H04M 3/42* (2006.01)
*H04W 4/02* (2009.01)

(52) U.S. Cl.
CPC .................................... *H04W 4/021* (2013.01)

(58) Field of Classification Search
USPC .......................................... 455/418; 370/338
See application file for complete search history.

(56) References Cited

U.S. PATENT DOCUMENTS

2010/0093350 A1* 4/2010 Wang et al. ................... 455/436

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 8)", version 8.10.0, Jun. 2011.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 8)", version 8.10.0, Jun. 2010.

ETSI TS 125.331, "3rd Generation Partnership Project; Technical Specification Group Radio Access Network; Radio Resource Control (RRC); Protocol specification (Release 10)", version 10.4.0, Jul. 2011.

3GPP TS 25.304, "3rd Generation Partnership Project; Technical Specification Group Radio Access Network; User Equipment (UE) procedures in idle mode and procedures for cell reselection in connected mode (Release 10)", version 10.0.0, Mar. 2011.

* cited by examiner

*Primary Examiner* — Marcos Batista

(57) ABSTRACT

A method in a mobile communication terminal, which operates alternately in an idle mode and a connected mode, includes maintaining a count of mobility events in which the terminal switches to camp on a cell. The count is retained irrespective of transitions of the terminal into and out of the idle mode and the connected mode. A mobility state is selected for the terminal depending on the count, and operation of the terminal is configured based on the selected mobility state.

14 Claims, 3 Drawing Sheets

ENHANCED MOBILITY STATE DETECTION IN MOBILE COMMUNICATION TERMINALS

CROSS-REFERENCE TO RELATED APPLICATIONS

This application claims the benefit of U.S. Provisional Patent Application 61/450,075, filed Mar. 7, 2011, whose disclosure is incorporated herein by reference.

FIELD OF THE DISCLOSURE

The present invention relates generally to wireless communication, and particularly to methods and systems for mobility state detection in mobile communication terminals.

BACKGROUND

Some wireless communication systems modify operation parameters of mobile communication terminals, e.g., cellular phones, depending on a level of mobility of the terminals. The Evolved Universal Terrestrial Radio Access (E-UTRA) specifications, for example, define normal, medium and high mobility states for User Equipment (UE).

Mobility states for E-UTRA UEs are addressed, for example, in "$3^{rd}$ Generation Partnership Project; Technical Specification Group Radio Access Network; Evolved Universal Terrestrial Radio Access (E-UTRA); User Equipment (UE) procedures in idle mode (Release 8)," TS 36.304, version 8.10.0, June, 2011; and in "$3^{rd}$ Generation Partnership Project; Technical Specification Group Radio Access Network; Evolved Universal Terrestrial Radio Access (E-UTRA); Radio Resource Control (RRC); Protocol specification (Release 8)," TS 36.331, version 8.10.0, June, 2010, which are both incorporated herein by reference.

Section 5.2.4.3 of the TS 36.304 specification, for example, specifies mobility states in idle mode. Section 5.5.6.2 of the TS 36.331 specification, for example, specifies speed-dependant scaling of measurement-related parameters.

The description above is presented as a general overview of related art in this field and should not be construed as an admission that any of the information it contains constitutes prior art against the present patent application.

SUMMARY

An embodiment that is described herein provides a method in a mobile communication terminal that operates alternately in an idle mode and a connected mode. The method includes maintaining a count of mobility events in which the terminal switches to camp on a cell, and retaining the count irrespective of transitions of the terminal into and out of the idle mode and the connected mode. A mobility state is selected for the terminal depending on the count, and operation of the terminal is configured based on the selected mobility state.

In some embodiments, maintaining the count at a given time includes counting the mobility events occurring in a time interval of a predefined length that precedes the given time, and retaining the count regardless of any transitions into and out of the idle mode and the connected mode that occur during the time interval. In an embodiment, maintaining the count includes counting at least one mobility event type selected from among cell hand-over events, cell reselection events, connection re-establishment events, redirection events, cell selection events and recovery events from an out-of-service condition.

In a disclosed embodiment, configuring the operation of the terminal includes setting, based on the selected mobility state, a minimal time interval that the terminal is to wait before permitting reselection of a different cell. In another embodiment, configuring the operation of the terminal includes setting, based on the selected mobility state, a minimal time interval over which an event is to be met before transmitting a measurement report communicating the event. In an embodiment, the method includes receiving from a base station a definition of ranges of the count that correspond to respective mobility states, and selecting the mobility state includes choosing the mobility state in accordance with the received definition.

There is additionally provided, in accordance with an embodiment that is described herein, apparatus including a transceiver and a control unit. The transceiver is configured to operate alternately in an idle mode and a connected mode. The control unit is configured to maintain a count of mobility events in which the transceiver switches to camp on a cell, to retain the count irrespective of transitions of the transceiver into and out of the idle mode and the connected mode, to select a mobility state for the transceiver depending on the count, and to configure operation of the transceiver based on the selected mobility state.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In accordance with the E-UTRA specifications, also referred to as Long Term Evolution (LTE), a User Equipment (UE) selects its current mobility state from among a normal mobility state, a medium mobility state and a high mobility state. The mobility states are typically indicative of the rate at which the neighbor cell environment around the UE changes. Typically, although not necessarily, the level of mobility corresponds to the motion velocity of the UE. The LTE specifications define criteria for selecting the mobility state, and setting of certain UE operation parameters (e.g., minimal time interval thresholds before permitting reselection to a different cell or before permitting transmission of a measurement report) based on the selected mobility state.

Embodiments that are described herein provide improved methods and systems for selecting mobility states in mobile communication terminals. In some disclosed embodiments, a mobile communication terminal operates alternately in an idle mode and a connected mode. The terminal selects a mobility state at a given time based on a count of mobility events that occur within a defined evaluation interval that precedes the given time. In some embodiments, the count of mobility events is unaffected by transitions into and out of the idle mode and the connected mode that may occur during the evaluation interval.

In the present context, a mobility event is defined as any event in which the terminal switches to camp on a cell. Examples of mobility events comprise cell reselection, handover between cells and cell selection (e.g., recovery from an out-of-service condition, connection reestablishment or leaving the connected mode). A high count of mobility events during an evaluation interval is typically indicative of high mobility of the terminal, and vice versa.

Since the disclosed techniques consider a relatively wide variety of mobility events, they are able to select the mobility state in a manner that closely reflects the true mobility of the terminal. Since the counting of mobility events is performed seamlessly over time periods that contain transitions into and out of the idle mode and the connected mode (as opposed to resetting the count upon such transitions), the disclosed techniques are able to rapidly adapt to changing channel conditions and changing connection conditions.

The disclosed techniques are able to provide a smooth and continuous estimate of the terminal's mobility state in difficult scenarios, e.g., scenarios that involve the terminal going into and out of service, and establishing and releasing connections. Because of the accurate mobility state selection, the terminal's communication performance (e.g., service provisioning, signal quality and link adaptation) is improved, and user experience is enhanced.

Figure 1:
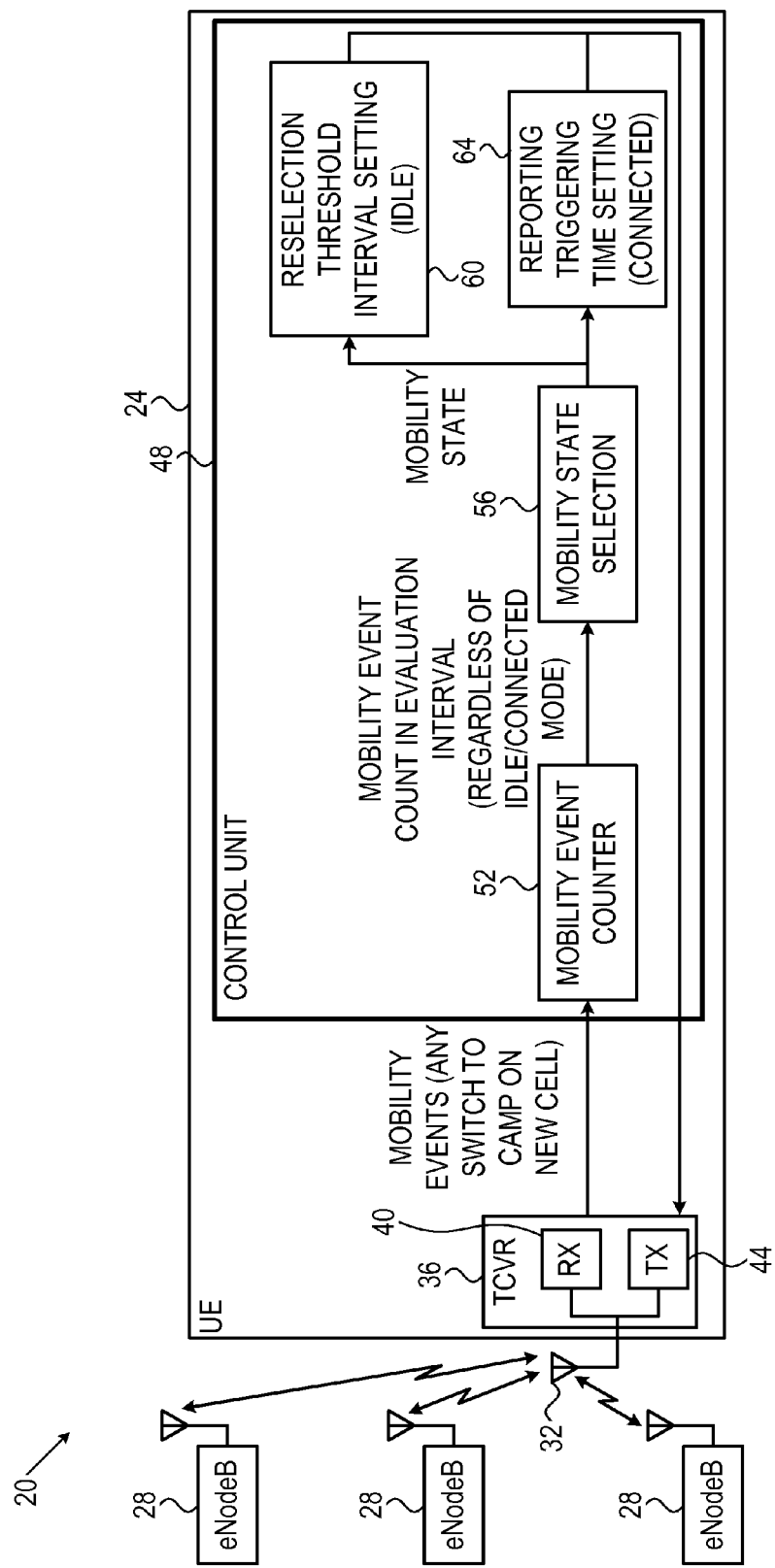
FIG. 1 is a block diagram that schematically illustrates a wireless communication system, in accordance with an embodiment that is described herein.

FIG. 1 is a block diagram that schematically illustrates a wireless communication system 20, in accordance with an embodiment that is described herein. In the present example, system 20 comprises a cellular system that operates in accordance with LTE specifications, two of which are cited above.

In alternative embodiments, system 20 may operate in accordance with the Universal Mobile Telecommunications System (UMTS) specifications. UMTS is specified, for example, in "3$^{rd}$ Generation Partnership Project; Technical Specification Group Radio Access Network; Radio Resource Control (RRC); Protocol specification (Release 10)," TS 25.331, version 10.2.0, December, 2010; and in "3$^{rd}$ Generation Partnership Project; Technical Specification Group Radio Access Network; User Equipment (UE) procedures in idle mode and procedures for cell reselection in connected mode (Release 10)," TS 25.304, version 10.0.0, March, 2011, which are incorporated herein by reference. Further alternatively, system 20 may operate in accordance with any other suitable communication standard or protocol that involves distinction between mobility states of mobile communication terminals.

In the example of FIG. 1, system 20 comprises a mobile communication terminal 24 (referred to in LTE terminology as User Equipment—UE) and three base stations 28 (referred to in LTE terminology as eNodeB). This choice of three base stations is made, however, purely by way of example. In real-life configurations, system 20 typically comprises a large number of base stations and a large number of terminals. Terminal 24 may comprise, for example, a cellular phone, a wireless-enabled computing device or any other suitable type of communication terminal. Base stations 28 are also referred to herein as cells. In some embodiments, a base station may comprise multiple collocated cells.

In accordance with the LTE specifications, terminal 24 operates alternately in a Radio resource Control (RRC) idle mode (typically when no active communication is conducted) or in a RRC connected mode (typically during active communication). These modes are referred to herein as idle mode and connected mode, respectively, for the sake of brevity. In either mode, the terminal monitors the signals of nearby cells. In idle mode, for example, the terminal continuously performs cell reselection, i.e., identifies a cell which is preferable for conducting subsequent communication. In connected mode, for example, the terminal transmits measurement reports that indicate quality levels of the signals received from nearby cells.

In some embodiments that are described herein, terminal 24 modifies certain aspects of its operation (e.g., sets minimal time interval thresholds before permitting reselection to a different cell or before permitting transmission of a measurement report) depending on its level of mobility. The level of mobility refers to the rate at which the neighbor cell environment around the terminal changes. Typically, although not necessarily, the level of mobility corresponds to the motion velocity of the terminal.

In a typical embodiment, terminal 24 detects its mobility state (e.g., normal, medium or high mobility) by counting the number of mobility events in which the terminal switches to camp on a new cell. A high count of mobility events within a defined evaluation interval is indicative of high mobility, while a low count of mobility events within the defined evaluation interval is indicative of low mobility, in accordance with an embodiment. Several examples of mobility events are given further below. Typically, the counting of mobility events and the detection of mobility state are performed regardless of transitions into and out of idle mode and connected mode that may occur during the process.

In the embodiment of FIG. 1, terminal 24 comprises a transceiver (transmitter-receiver) 36 that communicates via an antenna 32 with base stations 28 over uplink and downlink channels. Transceiver 36 comprises a receiver (RX) 40 that receives data from the base stations over downlink signals and decodes the received downlink signals, and a transmitter (TX) 44 that produces uplink signals that convey data to the base stations and transmits the uplink signals.

Transceiver 36 further comprises a control unit 48, which manages operation of the terminal. Among other tasks, the control unit selects a mobility state for the terminal by counting mobility events and modifies the terminal operation accordingly. In an embodiment, control unit 48 comprises a mobility event counter 52, which counts mobility events that are reported by transceiver 36. A mobility state selection module 56 selects a mobility state for terminal 24 based on the count of mobility events.

In various embodiments, control unit 48 modifies the operation of terminal 24 in different ways based on the selected mobility state. In an example embodiment, when the terminal is in idle mode, the control unit sets the minimal reselection threshold interval based on the terminal's mobility state. The minimal reselection threshold interval is defined as the minimal time interval the UE should wait before reselection to a different (typically better) cell is permitted.

In high-mobility scenarios it is typically desirable to allow a high rate of cell reselections, in order to continually select the best-performing cell which may rapidly change due to the relative high velocity of the UE. In low-mobility scenarios, on the other hand, it may be desirable to limit the rate of cell reselection, for example in order to reduce signaling overhead.

In an embodiment, control unit 48 comprises a reselection threshold interval setting module 60, which sets the minimal reselection threshold interval for terminal 24 based on the selected mobility state. In an embodiment, module 60 scales the minimal reselection threshold interval by a scaling factor that is based on the mobility state. The scaling factor is typically smaller for higher mobility, and vice versa. Alternatively, module 60 may set the minimal reselection threshold interval based on the mobility state of the terminal in any other suitable way. Control unit 48 reconfigures transceiver 36 with the updated minimal reselection threshold interval.

In another example embodiment, when terminal 24 is in connected mode, control unit 48 sets the triggering time for sending reports of signal quality by the terminal based on the selected mobility state. The quality reporting triggering time is defined as the minimal time interval over which a certain event should be met before transmitting a measurements report carrying this event to the network. In high-mobility scenarios it is often desirable to transmit quality reports at a high rate (small interval), in order to provide system 20 with up-to-date reception quality information. In low-mobility scenarios, it may be desirable to reduce the rate of quality reporting, for example in order to reduce signaling overhead.

In this embodiment, control unit 48 comprises a reporting triggering time setting module 64, which sets the quality reporting triggering time for terminal 24 based on the selected mobility state. In an embodiment, module 64 scales the reporting triggering time by a scaling factor that is based on the mobility state. The scaling factor is typically smaller for higher mobility, and vice versa. In LTE terminology the quality reporting triggering time is also referred to as "time to trigger." In alternative embodiments, module 64 may set the quality reporting triggering time based on the mobility state of the terminal in any other suitable way. Control unit 48 reconfigures transceiver 36 with the updated quality reporting triggering time.

In alternative embodiments, control unit 48 may modify any other parameter of terminal 24, or modify the operation of terminal 24 in any other suitable way, depending on the mobility state selected for the terminal.

The terminal configuration shown in FIG. 1 is an example configuration, which is depicted in a highly simplified manner solely for the sake of clarity. In alternative embodiments, any other suitable terminal configuration can be used. Terminal elements that are not mandatory for understanding of the disclosed techniques have been omitted from the figure for the sake of clarity.

In various embodiments, some or all of the elements of terminal 24, including receiver 40, transmitter 44 and control unit 48, are implemented in hardware, such as implementing receiver 40 and/or transmitter 44 using one or more Radio Frequency Integrated Circuits (RFICs), or implementing control unit 48 using one or more Field-Programmable Gate Arrays (FPGAs) or Application-Specific Integrated Circuits (ASICs). In alternative embodiments, certain elements of terminal 24 are implemented in software, or using a combination of hardware and software elements.

In some embodiments, certain terminal elements, such as certain elements of control unit 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

As noted above, in some embodiments control unit 48 selects a mobility state for terminal 24 based on the count of mobility events within a defined evaluation interval. In the present context, a mobility event is defined as any event in which terminal 24 switches to camp on a cell. This definition includes switching from one cell to another, as well as other forms of switching such as recovery from an Out Of Service (OOS) condition to camp on a cell.

Several examples of mobility events are specified in the LTE specifications cited above. Such mobility events comprise cell reselection (described in section 5.2.4 of TS 36.304), hand-over between cells (described in section 5.3.5.4 of TS 36.331), cell redirection (described in section 5.2.7 of TS 36.304) and cell selection (described in section 5.2.3 of TS 36.304). Cell selection is further sub-classified to cell selection as a result of recovery from an OOS condition (described in section 5.2.3 of TS 36.304), as a result of connection reestablishment (described in section 5.3.7 of TS 36.331) or as a result of leaving the connected mode (described in section 5.3.12 of TS 36.331 section 5.3.12 and section 5.2.7 of TS 36.304).

Figure 3A:
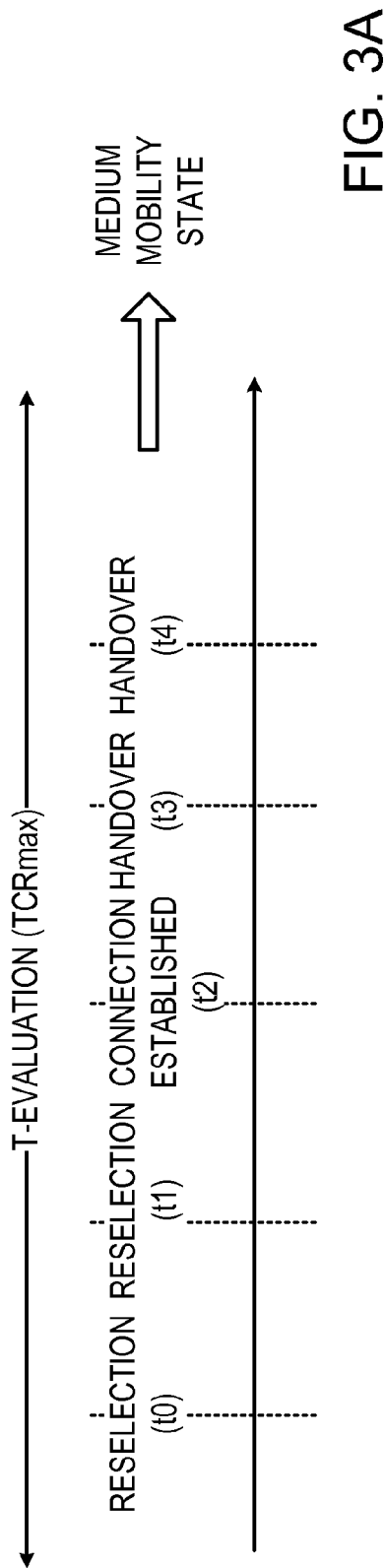
FIGS. 3A and 3B are diagrams that schematically illustrate examples of mobility state detection processes, in accordance with an embodiment that is described herein.
Figure 3B:
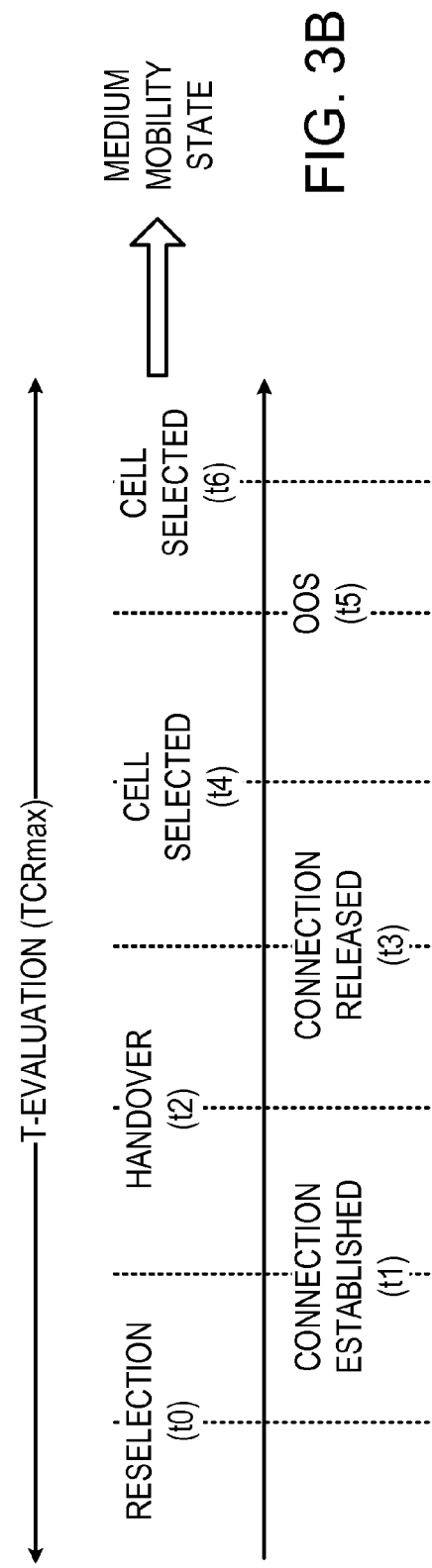

The mobility events listed above are presented by way of example. In various embodiments, control unit 48 may count any combination of these mobility events, and/or any other suitable mobility events, in order to select a mobility state for terminal 24. Some mobility events apply in idle mode, other mobility events apply in connected mode, and others may apply in both modes. Typically, control unit 48 counts the mobility events regardless of transitions into and out of idle mode and connected mode that may occur in the terminal during the evaluation interval. Example scenarios of this sort are shown in FIGS. 3A and 3B below.

In various embodiments, control unit 48 sets the evaluation interval, which can be set to any suitable length. Within the evaluation interval, control unit 48 maps any suitable count of mobility events to any of the mobility states, in an embodiment. In an example embodiment, control unit 48 sets the evaluation interval in the range between 30-240 seconds, and uses high/medium mobility count thresholds in the range of one to sixteen mobility events. Alternatively, however, any other suitable values or ranges can be used for the evaluation interval and mobility event count thresholds.

Figure 2:
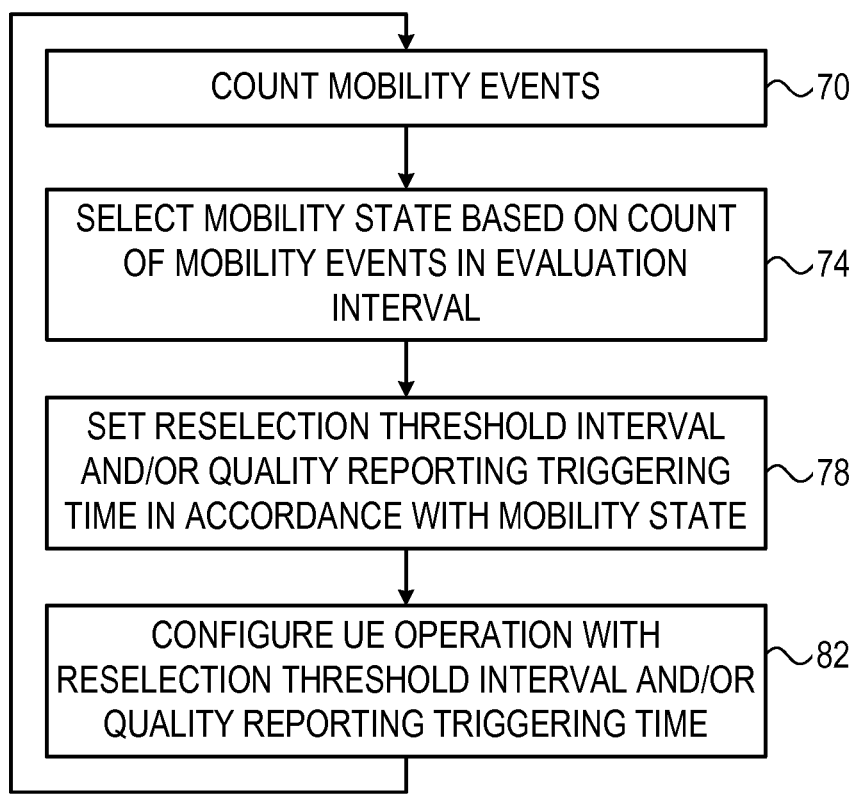
FIG. 2 is a flow chart that schematically illustrates a method for configuring UE operation based on mobility events, in accordance with an embodiment that is described herein.

FIG. 2 is a flow chart that schematically illustrates a method for configuring the operation of terminal 24 based on mobility events, in accordance with an embodiment that is described herein. The method begins with control unit 48 of terminal 24 counting mobility events within a defined evaluation interval, at a counting operation 70. Control unit 48 selects a mobility state for terminal 24 based on the count of mobility events within the evaluation interval, at a state selection operation 74.

Control unit 48 sets the minimal reselection threshold interval and/or the quality reporting triggering time of terminal 24 based on the selected mobility state, at a parameter setting operation 78. The control unit then configures the operation of transceiver 36 with the updated parameters, at a configuration operation 82.

Subsequent operation of terminal 24 is thus conducted in accordance with the updated minimal reselection threshold interval and/or the signal quality reporting triggering time. The method loops back to step 70 above, in which control unit 48 continues to count mobility events so as to continuously update the terminal's mobility state.

FIGS. 3A and 3B are diagrams that schematically illustrate examples of mobility state detection processes in terminal 24, in accordance with an embodiment that is described herein. These examples demonstrate the high speed and accuracy with which the disclosed techniques select the terminal's mobility state. In these examples, the evaluation interval is denoted T-Evaluation or $TCR_{max}$.

Terminal 24 is assumed to be configured by the base station with $TCR_{max}$, with a parameter $N_{CR_{13}\_M}$ that defines the number of hand-over or reselection events that should cause transition from the normal mobility state to the medium mobility state, and with a parameter $N_{CR\_H}$ that defines the number of hand-over or reselection events that should cause transition from the medium mobility state to the high mobility state.

In accordance with the LTE specifications cited above, these parameters are provided to the terminal in a system information broadcast of the serving cell in idle mode, and in a measurement configuration message in connected mode. Generally, in some embodiments, terminal 24 receives from a base station a definition that defines the respective range of mobility event numbers corresponding to each mobility state. Control unit 48 selects the mobility state in accordance with the definition.

In the example of FIG. 3A, at the beginning of the evaluation interval the terminal is in idle mode. During the evaluation interval, the terminal performs cell reselection at time t0 and again at time t1. At a time t2, the terminal establishes a connection (i.e., transitions to connected mode) and thus potentially receives the $TCR_{max}$, $N_{CR\_M}$ and $N_{CR\_H}$ parameters from the base station. In this example, $N_{CR\_M}=3$. At times t3 and t4 the terminal performs hand-over.

In accordance with a naïve implementation of the mechanism defined in TS 36.304, the hand-over count at time t4 is 2 (less than $N_{CR\_M}=3$) and therefore the mobility state would be set to normal mobility. This naïve count, however, does not consider the reselection and connection establishment events that occurred at times t0, t1 and t2, which provide additional significant information as to the mobility of the terminal (The TS 36.304 specification strictly separates between counting reselection events and counting hand-over events.)

When using the disclosed techniques, on the other hand, the count of mobility events at time t4 is 4 (exceeding $N_{CR\_M}=3$) and therefore unit 48 will select the medium mobility state. This setting genuinely reflects the level of mobility of the terminal. Note that in this example the terminal transitioned from idle mode to connected mode during the evaluation interval—at time t2. The count of mobility events nevertheless spanned the entire evaluation interval and was unaffected by the mode transition.

FIG. 3B demonstrates a scenario in which the naïve implementation of the TS 36.304 mechanism retains the terminal at the normal mobility state, even though many mobility events occur in the evaluation interval. The disclosed techniques, on the other hand, detect the frequent occurrence of mobility events and set the terminal to the medium mobility state accordingly.

In the example of FIG. 3B, the terminal is in idle mode at the beginning of the evaluation interval. At time t0 the terminal performs cell reselection. At time t1 the terminal establishes a connection and thus transitions to connected mode. At time t2 the terminal hands-over to a different cell. At time t3 the connection is released. Cell selection is performed at time t4, and an Out-Of-service (OOS) condition occurs at time t5. At time t6 a new cell is selected.

In this example too, the naïve implementation of the TS 36.304 mechanism would select the normal mobility state for the terminal, even though the actual occurrences during the evaluation interval indicate high mobility. The disclosed techniques, on the other hand, will select the medium mobility state for this scenario. The latter selection better reflects the actual mobility of the terminal.

As demonstrated by the two examples above, the disclosed techniques enable fast and smooth transition between mobility states, which closely reflects the genuine level of mobility of the terminal. Since the counting of mobility events is not reset when transitioning between idle mode and connected mode, the disclosed technique enables the terminal to reselect the true mobility state after returning from out-of-service conditions.

Although the embodiments described herein mainly address setting of reselection threshold intervals and quality reporting triggering times of a terminal based on the terminal's mobility state, the methods and systems described herein can also be used for modifying any other algorithm or parameter of the terminal based on mobility state. In an example embodiment, when the terminal performs a certain search, search parameters such as depth and length can be set in accordance with the terminal's mobility state.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a mobile communication terminal that operates alternately in an idle mode and a connected mode, determining a mode-independent count of mobility events in which the terminal switches to camp on a cell, over a time interval that contains one or more transitions of the terminal into and out of the idle mode and the connected mode, including counting one or more of the mobility events while the terminal is in the idle mode and counting at least one of the mobility events while the terminal is in the connected mode;
    selecting a mobility state for the terminal depending on the mode-independent count; and
    configuring operation of the terminal based on the selected mobility state.

2. The method according to claim 1, wherein determining the mode-independent count comprises retaining the mode-independent count regardless of any transitions into and out of the idle mode and the connected mode that occur during the time interval.

3. The method according to claim 1, wherein determining the mode-independent count comprises counting at least one mobility event type selected from among cell hand-over events, cell reselection events, connection re-establishment events, redirection events, cell selection events and recovery events from an out-of-service condition.

4. The method according to claim 1, wherein configuring the operation of the terminal comprises setting, based on the selected mobility state, a minimal time interval that the terminal is to wait before permitting reselection of a different cell.

5. The method according to claim 1, wherein configuring the operation of the terminal comprises setting, based on the selected mobility state, a minimal time interval over which an event is to be met before transmitting a measurement report communicating the event.

6. The method according to claim 1, comprising receiving from a base station a definition of ranges of the count that correspond to respective mobility states, wherein selecting the mobility state comprises choosing the mobility state in accordance with the received definition.

7. Apparatus, comprising:
a transceiver, which is configured to operate alternately in an idle mode and a connected mode; and
a control unit, which is configured to determine a mode-independent count of mobility events in which the transceiver switches to camp on a cell, over a time interval that contains one or more transitions of the transceiver into and out of the idle mode and the connected mode, including counting one or more of the mobility events while the terminal is in the idle mode and counting at least one of the mobility events while the terminal is in the connected mode, to select a mobility state for the transceiver depending on the mode-independent count, and to configure operation of the transceiver based on the selected mobility state.

8. The apparatus according to claim 7, wherein the control unit is configured to retain the mode-independent count regardless of any transitions into and out of the idle mode and the connected mode that occur during the time interval.

9. The apparatus according to claim 7, wherein the control unit is configured to count at least one mobility event type selected from among cell hand-over events, cell reselection events, connection re-establishment events, redirection events, cell selection events and recovery events from an out-of-service condition.

10. The apparatus according to claim 7, wherein the control unit is configured to set, based on the selected mobility state, a minimal time interval that the transceiver is to wait before permitting reselection of a different cell.

11. The apparatus according to claim 7, wherein the control unit is configured to set, based on the selected mobility state, a minimal time interval over which an event is to be met before transmitting from the transceiver a measurement report communicating the event.

12. The apparatus according to claim 7, wherein the transceiver is configured to receive from a base station a definition of ranges of the count that correspond to respective mobility states, and wherein the control unit is configured to select the mobility state in accordance with the received definition.

13. A mobile communication terminal comprising the apparatus of claim 7.

14. A chipset for processing signals in a mobile communication terminal, comprising the apparatus of claim 7.

* * * * *